US005602298A

United States Patent [19]
Levin

[11] Patent Number: 5,602,298
[45] Date of Patent: *Feb. 11, 1997

[54] METHOD AND APPARATUS FOR CONVERTING ORGANIC MATERIAL INTO HYDROGEN AND CARBON BY PHOTODECOMPOSITION

[75] Inventor: George B. Levin, Pittsburgh, Pa.

[73] Assignee: Advanced Waste Treatment Technology, Inc., Chicago, Ill.

[ * ] Notice: The term of this patent shall not extend beyond the expiration date of Pat. No. 5,100,638.

[21] Appl. No.: 418,648

[22] Filed: Apr. 10, 1995

Related U.S. Application Data

[63] Continuation-in-part of Ser. No. 24,092, Feb. 25, 1993, abandoned, which is a continuation-in-part of Ser. No. 333,092, Apr. 4, 1989, Pat. No. 5,100,638.

[51] Int. Cl.[6] ..................................................... A62D 3/00
[52] U.S. Cl. ................ 588/227; 204/158.2; 204/158.21; 110/346; 588/205; 588/209; 588/212; 423/445 R; 423/449.1; 423/650
[58] Field of Search ....................... 110/346; 204/158.2, 204/158.21; 423/445.2, 449.1, 650; 588/205, 209, 212, 227

[56] References Cited

U.S. PATENT DOCUMENTS

| | | | |
|---|---|---|---|
| 2,007,586 | 7/1935 | Stalhane et al. | 23/207 |
| 2,106,137 | 1/1938 | Reed | 134/60 |
| 4,056,602 | 11/1977 | Matovich | 423/345 |
| 5,100,638 | 3/1992 | Levin | 423/449 |
| 5,102,647 | 4/1992 | Yamada et al. | 423/447.3 |

FOREIGN PATENT DOCUMENTS

| | | |
|---|---|---|
| 5098 | 3/1916 | United Kingdom . |
| 1444564 | 8/1976 | United Kingdom . |

OTHER PUBLICATIONS

"Radiative Heat Transfer By Flowing Multiphase Medium—Part II. An Analysis On Heat Transfer Of Laminar Flow In An Entrance Region Of Circular Tube", *Int. J. Heat Transfer*, vol. 15, pp. 2596–2610, Pergamon Press, 1972.

"Thermal Destruction Of Chlorinated Hydrocarbons With A High–Temperature Fluid–Wall Reactor", Ref. #TRC260, Industrial Environmental Research Laboratory, U.S. Environmental Protection Agency, Cincinnati, Ohio, Mar. 1983.

*Primary Examiner*—Howard E. Schain
*Assistant Examiner*—C. Delacroix-Muirheid
*Attorney, Agent, or Firm*—McAndrews, Held & Malloy, Ltd.

[57] ABSTRACT

A method for processing waste material converts organic matter such as non-pretreated infectious hospital wastes, hazardous wastes, refinery wastes, paper wastes and other similar gaseous, liquid, or solid organic wastes, into hydrogen and carbon by photodecomposition. The waste material is converted by exposing the organic waste materials to a sufficiently intense field of radiation which causes the decomposition, or breakdown, of the organic materials into their component elements. Because the environment within the reaction chamber is controlled to minimize the presence of oxidizing agents, the decomposition products, primarily carbon and hydrogen, can be withdrawn and collected for subsequent use.

10 Claims, 1 Drawing Sheet

METHOD AND APPARATUS FOR CONVERTING ORGANIC MATERIAL INTO HYDROGEN AND CARBON BY PHOTODECOMPOSITION

CROSS-REFERENCE TO RELATED APPLICATIONS

This application is a continuation-in-part of U.S. application Ser. No. 08/024,092 filed Feb. 25, 1993, now abandoned, which is a continuation-in-part of U.S. Application Ser. No. 07/333,092 filed Apr. 04, 1989, now U.S. Pat. No. 5,100,638.

FIELD OF THE INVENTION

The present invention relates to methods for recycling organic materials, including organic waste materials, by decomposing the organic materials into the elements of which the organic materials are composed, primarily carbon and hydrogen.

BACKGROUND OF THE INVENTION

In response to environmental and economic concerns, developing public policy throughout the world emphasizes the increased recycling of waste materials. The U.S. Environmental Protection Agency has recommended that twenty-five percent of solid wastes should be recycled. Various states have passed laws mandating the recycling of certain wastes. Certain industries, the plastics industry in particular, are promoting the increased recycling of materials, including the development of new technologies and markets for recycled products.

Solid carbon may be produced in a variety of physical forms, including a form known in the field as carbon black. This latter form of solid carbon is used in the fabrication and manufacture of many items including automobile tires, paints, and audio and video tapes.

Typically, the "bottoms," or waste oil, from refineries have been used in the manufacture of carbon black. The conventional manufacturing process for carbon black from waste oil requires the use of special reactors, high temperatures, and the combustion of fossil fuels. The cost of manufacturing carbon black by the conventional type of process has been on the order of $0.20 per pound. Average industrial prices for carbon black are in the range of $0.20 to $0.26 per pound.

Hydrogen in its elemental form is an extremely light gas which is also highly flammable. Hydrogen is an excellent fuel because of the large amount of energy produced per unit mass of hydrogen consumed in a combustion reaction with oxygen. Hydrogen is further desirable as a fuel because, when it undergoes oxidation, the only product of this reaction is water vapor which is completely non-polluting. Because of these desirable characteristics, it is used, for example, in fuel cells to produce energy.

The problem of managing the wastes produced by industry, hospitals, and homes is quickly reaching crisis proportions. The use of landfills, the traditional waste disposal method in the United States, now must be considered the method of last choice. Existing landfills are nearly at capacity. Many are leaking and, as a result, are polluting groundwater, and many could eventually end up as Superfund sites. Furthermore, as a matter of political reality, it is almost impossible to establish new landfills to replace those existing landfills now nearly at capacity.

Incineration has increasingly become the waste disposal method of choice for industry. Community resistance to incineration, however, is strong and steadily increasing because of the amounts of toxic organic chemicals, such as dioxins and furans, and of toxic heavy metals, emitted by incinerators, and because of other difficulties associated with the operation of incinerators. In addition, incinerators are expensive, and their use has resulted in a large increase in the cost of waste treatment. As a practical matter, obtaining the required government permits for new incinerators has also become as difficult as obtaining the permits for new landfills.

As the environmental requirements for landfills are increased and the use of incineration increases, the cost for the management of wastes increases as well. For example, solid waste costs increased by a factor of three in the one year from 1988 to 1989 in Pittsburgh and now are generally between $75 and $150 per ton in New Jersey and other Northeastern States. Costs for disposal of hazardous wastes and medical wastes are greater, typically exceeding $300 per ton.

Incinerators and incinerator-type waste treatment technologies use high temperature oxidation, or burning, of organic materials as the basic means of waste treatment. Optimally, these types of processes result primarily in the production of carbon dioxide and water as products of the treatment process. Small amounts of other materials are produced depending upon the elements present in the feed materials. However, there are basic problems associated with combustion-based incinerators in that they are difficult and expensive to operate and that they create potentially hazardous hydrocarbon species through incomplete combustion.

Hobbs U.S. Pat. No. 3,648,630 and Hardison et al. U.S. Pat. No. 4,667,609 describe incinerators that use infrared radiation from black body radiators to heat solids as a means to promote combustion, or oxidation, of the waste materials with which the solids are contaminated. The basic process in these incinerators, combustion, is the same as in incinerators which use the burning of fossil fuels as a means to heat the waste materials to combustion temperatures.

A proposed solution to the problems of incineration is described in Matovich U.S. Pat. No. 3,933,43. The Matovich patent discloses a high temperature fluid-wall waste-treatment device for wastes containing up to 10 percent organics, in which the energy required is supplied to a chemical reactor by radiation. Matovich's high temperature fluid wall reactor (HTFWR) is a once-through, vertical tube reactor. After preprocessing, which for solids is an extensive operation that reduces the solid matter to 50–100 mesh size, the raw materials are introduced into the top of the reactor and fall within a hollow, porous carbon core to the bottom outlet of the reactor. Matovich's HTFWR is heated electrically by resistance heaters or by other means located outside the hollow, porous carbon core. The heaters are radiatively coupled to the hollow, porous carbon core and heat the core radiatively. The raw materials falling within the hollow core are heated by radiation from the core.

Even though it does not rely primarily on oxidation reactions, the Matovich device has other serious shortcomings. One shortcoming is that all solid material to be treated must first be processed to extremely small size (less than about 100 mesh) so that the particles will remain within the radiation zone for a sufficiently long time to decompose. Another drawback of the Matovich device is that it requires a continual flow of nitrogen gas through the reactor, the fluid wall, to protect the heaters, insulation and walls from oxidation and damage from molten materials. The fluid wall forms a reaction chamber within the interior of the hollow, porous carbon core, thereby protecting the surface facing toward the interior of the core from becoming damaged by molten inorganic materials. The presence of the undesirable fluid wall adds considerable expense to the operation of the Matovich device.

Still another approach to overcoming the problems with incineration is the Electric Pyrolyzer, a system that was developed by the Westinghouse Electric Corporation, and that may be used at temperatures as high as 3000° F., and in a low oxygen environment, to process predominantly inorganic wastes such as contaminated soils that have no more than a 10% composition by mass of organic contaminants. See, in this regard, the report on pages 4–12 through 4–14 in the May/June 1988 edition of *The Hazardous Waste Consultant*.

Both the Matovich and the Westinghouse devices, in addition to other shortcomings in their operation, cannot recycle the treated waste into useful forms such as solid carbon and hydrogen gas.

Accordingly, it is an object of the present invention to provide a method of recycling of organic waste materials, including non-pretreated infectious hospital waste, refinery waste, waste paper, food processing waste, and other similar solid, liquid, and gaseous wastes, by decomposing the organic content of these wastes primarily into carbon, which forms as a powder, and hydrogen.

A related object of the present invention is to provide a method in which the organic waste materials are recycled through decomposition into their constituent elements by absorption of radiant energy.

Another objective of the present invention is to provide a system with a suitable environment such that the use of inert gases is not required and such that unwanted chemical reactions are avoided through the use of a substantially closed system produced by recycling the exhaust gases, thereby producing an environment consisting predominantly of hydrogen within the system.

A further related object of the present invention is to provide a method in which pretreatment of the waste materials is not required, and a minimum amount of size reduction of materials is necessary to allow the waste materials to be readily introduced into the reactor.

A still further object of the present invention is to provide a method in which the carbon and hydrogen can be removed from a stream of exhaust gases from the reactor without first requiring extensive processing to substantially cool the exhaust gas stream.

Still another object of the present invention is to provide a method which employs a closed reactor system in which the exhaust gas stream is recycled to the reaction chamber so that whatever small amount of gases are eventually released to the environment are substantially free from potentially harmful hydrocarbon molecules.

SUMMARY OF THE INVENTION

The above and other objects are achieved by a method for converting organic material, particularly organic waste materials such as non-pretreated infectious hospital wastes, hazardous wastes, refinery wastes, paper wastes and other similar gaseous, liquid, or solid organic wastes, into hydrogen and carbon, and collecting these valuable materials for subsequent use. The conversion of the material is accomplished by exposing the organic waste materials (or other organic materials) to a sufficiently intense field of blackbody radiation which causes the decomposition, or breakdown, of the organic materials into their component elements. Since the environment within the reaction chamber is controlled to minimize the presence of oxidizing agents, the decomposition products, primarily carbon and hydrogen, can be collected for subsequent use. Such subsequent uses include directing the hydrogen to an apparatus for oxidizing hydrogen to produce an oxidizing exit stream and electrical energy, and directing the oxidized exit stream through a heat exchanger to derive thermal energy from the exit stream.

More specifically, the present method is an improvement over the invention of U.S. application Ser. No. 07/333,092 filed Apr. 19, 1989, now U.S. Pat. No. 5,100,638, referred to above, in that both carbon and hydrogen are collected from the decomposed organic waste materials in forms suitable for subsequent use. The present method represents a further improvement in that the collection of carbon can be achieved at elevated temperatures, making extensive cooling unnecessary.

The present method employs a substantially closed system in which total system gas pressure may be controlled, and which serves to exclude oxygen gas from the reactor system. This closed system is formed by a reactor, device(s) for collecting carbon and hydrogen, a fan, and interconnecting piping.

The present method employs a system that has a reactor with an internal reaction chamber formed of materials that can tolerate high temperatures and other operating conditions without the need for inert gases or other protection, that possess low thermal mass, that limit or restrict the passage of heat, and that may function as almost perfect black body radiators at high temperatures. These materials may be used in layers to form the walls and take advantage of the different characteristics of the various materials. The carbon particles and hydrogen gas formed by the decomposition of organic materials are carried from the reactor through ceramic ducts into device(s) for collecting the carbon. A water spray into the duct may be used to slightly cool the exhaust gas stream and promote the agglomerization of the carbon. The exhaust gas stream is preferably cooled to a temperature of approximately 750° C.

The suspended carbon particles are removed from the exhaust gases by directing the exhaust gas stream through cyclone(s) and fabric filter(s) which are constructed of materials that tolerate temperatures as high as 1200° C. The use of filters which can operate at such high temperatures reduces the need to substantially cool the exhaust gases before subjecting them to further process steps. The exhaust gas stream, from which substantially all ($\geq 99.9\%$) of the carbon particles produced through decomposition of organic waste materials have been removed, is then sucked into a fan that is suitable for operation at temperatures as high as 800° C. Again, the use of a fan which can operate at such high temperatures substantially reduces the need to cool the exhaust gas stream before directing it toward subsequent process steps.

Most of the exhaust stream from the fan is directed back to the cyclone(s) and filter(s). A small portion of the exhaust gas flow is recirculated to the reactor to assist in removing the carbon. Less than 10% of the exhaust gases from the fan is directed to the hydrogen collection/utilization equipment. This is approximately the same amount of hydrogen produced by the decomposition of the feed materials, thus maintaining the system at essentially atmospheric pressure.

In the present method, unlike incineration processes and other high temperature processes, the organic materials do not react with oxygen during processing. The essentially complete absence of oxygen, and the relatively long residence times achieved through recycling of exhaust gases, allow the almost complete recovery of useful materials, carbon and hydrogen, and precludes the formation of most toxic organic byproducts, particularly dioxins and furans, that typically form through less than complete combustion processes.

The present method makes use of an essentially closed system in order to minimize the introduction of air into the system and controlling the environment within the reactor and system. The system can be made initially inert (oxygen-free) by filling with nitrogen or it may contain air. After only a small mass of organic material is processed, the primary gas within the system will be hydrogen produced by the decomposition of the organic materials, even if oxygen was present in the system initially. Whatever oxygen was present initially will be rapidly depleted through reactions with hydrogen and carbon, and will not be further replenished, as the additional introduction of air is severely restricted. Thus, the atmosphere within the reactor rapidly becomes primarily hydrogen, whatever the initial composition of gases within the reactor system.

The present closed system allows the substantial reduction of the total volume of gases that is released to the atmosphere and virtually eliminates the release of potentially toxic materials to the environment. The only materials that are removed from the system in significant quantities are the desired products, carbon and hydrogen. If the materials being processed contain significant amounts of oxygen, or if oxygen is introduced into the system along with the materials to be treated, a limited amount of carbon monoxide will be formed. Acid gases and other contaminants which might form during processing may be removed from the exhaust gas stream prior to release to the environment. The limited amount of exhaust gases released to the environment should consist only of small amounts of nitrogen from the initial flushing of the system or the air initially in the system at startup, carbon dioxide and oxides of nitrogen produced during downstream processing of hydrogen, water, and possibly other gases depending upon the composition of the materials fed to the reactor.

The exhaust gas flow from the system is relatively small facilitating subsequent cleansing of the exhaust stream for whatever process employs the hydrogen. For example, in very large systems, it is likely that the hydrogen will be recovered for sale. After recovery of the hydrogen, the off-gas flow will be very small, less than 1% by mass of the hydrogen, and can easily be cleaned to remove carbon monoxide. In very small systems, it is likely that the hydrogen will be used to produce electricity in a fuel cell or internal combustion engine. The exhaust should be cleaner than that associated with an automobile as the fuel is cleaner.

In the present method, solid organic waste materials to be processed remain in the reaction chamber until decomposed into carbon and hydrogen. Inorganic residue that collects in the bottom of the reactor is removed through a special drain. For example, when operated in batch processing mode, a typical load of 100 pounds of solid waste materials, composed primarily of solid organic materials, can be decomposed to carbon and hydrogen in approximately ten minutes in a 600 to 750 kW reactor. If the solid materials contained a significant component of inorganic materials, after decomposition of the organic component of the waste, the only material remaining in the reactor would be the inorganics. These would remain on the bottom of the reaction chamber in either solid or liquid form, depending on the melting point of the material.

In the present method, gas phase organic chemicals have at least an initial one second residence time within the reaction chamber, assuming no interaction with solids within the reaction chamber and no further recycling of the gases. The residence time in most commercial units will be 3–4 seconds as this imposes a very small financial penalty and conforms to current regulatory requirements and social considerations. The effective residence time for gases in the reactor is increased through the recycling of exhaust gases back into the system. Furthermore, carbon within the reactor or on the filter can adsorb organic chemicals, including gases, providing additional residence time, extending to as long as a few minutes, or until the organic molecules decompose into carbon and hydrogen. Ultimately, the total effective residence time is determined by the design of the reactor, the amount of gases recycled through the reactor, and the frequency of backflushing of the filters and removal of the carbon from the filters. This long residence time insures that larger hydrocarbon molecules, if present, will have ample time within the reactor system to decompose completely to the desired end-products, carbon and hydrogen. In this manner, the possibility of releasing potentially hazardous gaseous hydrocarbon molecules to the environment is greatly reduced, if not totally eliminated.

DETAILED DESCRIPTION OF THE PREFERRED EMBODIMENT

Figure 1:
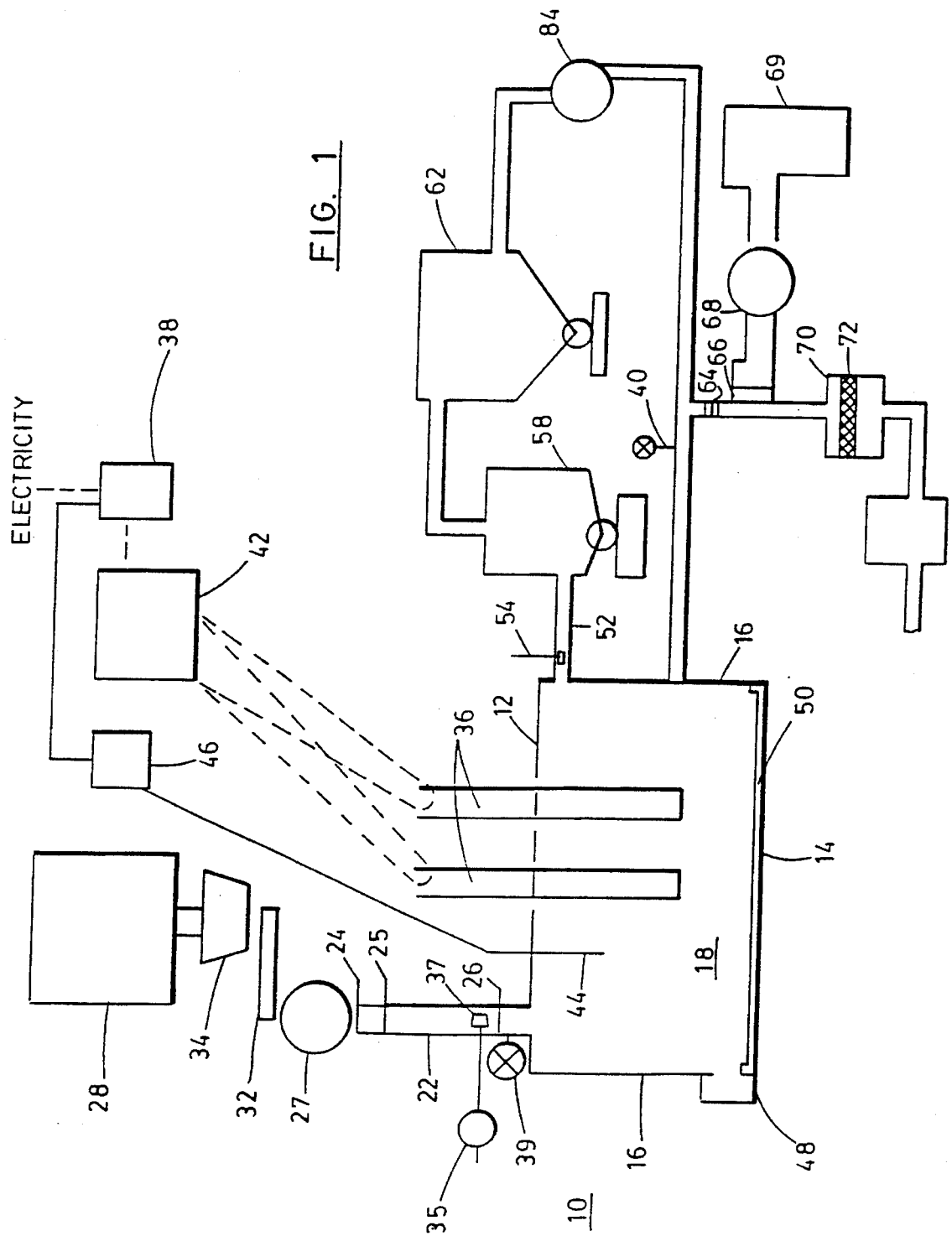
FIG. 1 is a schematic diagram of the system for producing carbon and hydrogen from solid, liquid, or gaseous organic materials in accordance with the teachings of the present invention.

Referring to FIG. 1, a reactor, shown generally by the numeral 10, includes a top wall 12, a bottom wall 14, and side walls 16. The walls 12, 14, 16 serve to define a substantially closed, internal cavity or reaction chamber 18 within the reactor 10. The particular configuration or shape of the reactor 10 and the reaction chamber 18 is not critical to the performance of the present method.

The walls 12, 14, 16 of the reactor 10 are constructed of fibrous ceramic materials and other suitable materials which are tolerant to the anticipated temperatures in the reactor, have low thermal mass, resist the transmission of energy, are tolerant to rapid temperature transients, and have high radiant emissivities. Materials may be installed in layers with different materials in each layer. Steel or other such materials, not shown in FIG. 1, may be used as an outer reinforcement for the fibrous ceramic materials and for structural strength.

The thickness of the walls is chosen to minimize energy loss. The particular materials used to construct the walls and the thicknesses of the walls are determined by the particular operating temperature selected for the reactor. For example, if the maximum operating temperature in the chamber is to be 1500° C., the materials forming the chamber should be suitable for temperatures up to 1650° C. or more. With these temperatures, the walls 12, 14, 16 preferably should be at least six or more inches thick so that the outer shell temperature of the reactor 10 will be sufficiently low so as not to constitute a health or safety hazard, and to reduce energy losses from the reactor. Fibrous ceramic materials that may be used for this purpose include those marketed by the Carborundum Company of Niagara Falls, New York, under the trade designation "Fiberfax."

The reactor 10 may be used to process a variety of different types of organic materials. These materials can include waste materials such as infectious hospital wastes, refinery wastes, paper wastes, food processing wastes, chlorofluorohydrocarbons, and other similar solid, liquid, or gaseous organic wastes. The waste materials may contain only organic materials or may contain substantial amounts of inorganic materials. The solid waste materials may be in a variety of assorted shapes and sizes. The materials need not be pretreated, and can be processed as they are received from their sources except, as explained below. The materials may have to be roughly shredded mechanically or reduced to a size and shape that can be introduced into the reactor. This can be accomplished by a conventional shears or mechanical shredder.

When these materials are in solid form, a primarily vertically oriented feed chute 22 may be used to introduce or feed them into the reaction chamber 18. The size and shape of the feed chute 22 is generally determined by the size and nature of the materials being introduced into the reactor. Its lower end opens directly into the reaction chamber 18, and its upper end is normally closed by a removable cover plate 24. To conserve energy and to trap radiant energy within the reactor, the feed chute may include one or more changes of direction, and the length of the feed chute 22 should be more than four times its diameter. The walls of the feed chute are constructed of the same fibrous ceramic material as used for the walls 12, 14, 16. In some applications, the feed chute may be lined with abrasion resistant materials such as a ceramic foam marketed by HiTech Ceramics of Alfred, N.Y., under the trade designation "Udicell."

Conventional steel knife valves 25 and 26 are mounted within the upper part of the feed chute 22 and are used to control the feeding of solid waste materials into the reaction chamber 18 and to reduce the introduction of air along with the feeding of the waste materials into the reaction chamber. An example of such valves is the "Slide Gate" marketed by William W. Meyer & Son, Inc. of Skokie, Ill.

If the continuous feeding of waste materials is desired, a rotary valve 27 may be used. An example of such a rotary valve is the "Roto-Flo" valve also marketed by William W. Meyer & Son, Inc. of Skokie, Ill. Whatever type of valve or assembly is utilized, the introduction of oxygen into the reaction chamber 18 through the feed chute 22 should be restricted so as to minimize, to the extent practical, the amount of oxidation occurring in the reaction chamber.

Hazardous and infectious wastes are typically packaged for ease and safety in handling and transportation. Such materials may be directly fed into the reactor 10 if the feed chute 22 has been properly sized to accommodate such packaged wastes. Since further handling of these materials is undesirable, direct feeding of the packaged wastes is preferred.

The solid materials to be processed are stored in a conventional storage bin 28 or other facility and, as noted, may be loaded into the feed chute 22 without pre-treatment, by means of a conventional conveyor 32, such as a belt conveyor, or manually. After the feed chute 22 is loaded, the cover plate 24 is again placed over the upper end of the feed chute or the upper knife valve 26 is closed and the lower knife valve 26 is opened. If all or part of the waste materials are too bulky to fit easily within the feed chute 22, they may be roughly reduced in size by a conventional coarse shredder that is shown generally at 34, and that is positioned between the storage bin 28 and the conveyor 32.

If the organic waste material to be processed is in a liquid form, a conventional pump 35 can be used to move this organic material into the feed chute 22. A conventional nozzle 37 may be used to disperse this liquid feed material, but the particle size of the spray should not be small, as the larger particles of liquid absorb infrared radiation more efficiently. In this regard, the spray particles should be at least 100 microns in size. In all other aspects, the reactor and the downstream system function identically as when the feed material is in solid form.

When the organic waste material to be processed is in the form of a gas, the gaseous material can be injected into the exhaust gas stream being recycled back to the reactor by means of a conventional gas valve 40 at a point between where the exhaust gas stream is split and the recycled gases enter the reaction chamber 18.

Most waste streams contain some organic materials. These materials melt under the influence of the radiant field. When fed into reactor 10 via the feed chute 22, these materials may encounter the walls of the feed chute and will collect on the bottom wall 14 of the reactor 10. The inner layer of the walls of the reactor 10 and feed chute 22 are materials that are compatible with molten inorganic materials without the need for special precautions. Because molten inorganic materials are very corrosive, the inner layer of each wall is designed to be replaced without replacing the entire wall.

A plurality of conventional radiant heaters 36, such as electrical resistance heaters, two of which are shown in FIG. 1, are mounted in the top wall 12 of the reactor 10. The heaters hang from the wall 12 into the reaction chamber 18. Other arrangements of the heaters, such as flush against the top wall 12 or on bars extending from side wall 16 to an opposite side wall 16, may also be utilized. The particular orientation of the heaters is inconsequential to the functioning of the reactor. The size and number of the heaters 36 is determined by the size of the reactor 10; the desired processing rate of waste material; the energy losses to the environment; the amount of organic and inorganic matter in the materials to be processed; and the particular heaters being used. In this regard, the heaters 36 must, however, generate sufficient energy to raise the temperature of the reaction chamber 18 so that the inner walls of the reaction chamber are maintained at a high enough energy level to create, through black body emission, a field of radiant energy capable of promoting the decomposition of organic waste materials.

The size of the reactor 10, its wall thickness, the size of the reaction chamber 18, the particular fibrous ceramic materials used, the amount of organic and inorganic material, and the specific decomposition reactions will be determinative of the energy needed to maintain the reactor at a given temperature. Ultimately, the choice of heaters 36 is based on economic considerations and the operating temperatures required for the particular material or materials being processed. Specifically, however, the heaters 36 need to have the capacity to be able to heat the reaction chamber 18 to temperatures from approximately 1100° C. to approximately 1800° C. Heaters having this capacity include the model "Kanthal Super 33" or "Kanthal 1900" marketed by the Kanthal Corp. of Bethel, Conn.

With respect to decomposing organic materials, it is known that under appropriate conditions organic molecules will decompose into their constituent atoms. Decomposition of organic molecules occurs in the absence of reactive species, including oxygen, and when the energy of the molecules becomes sufficiently high that the molecules are unstable. In very high energy states, the molecular form becomes less stable than that state in which the individual atoms are not associated with other atoms.

In large, complicated organic molecules, all of the various forms of internal energy are coupled to each other. Thus, rotational energy, vibrational energy, and electronic energy are coupled and interchanges between these forms of energy occur rapidly. Kinetic energy, which is translational energy, appears as molecular vibrations in solid organic materials and is coupled to the internal energies of the molecule by a phonon field. In the gas phase, kinetic energy is coupled to the internal energies via inelastic collisions among the molecules and the reactor walls, and interchange of kinetic energy with internal energies occurs more slowly and less efficiently than interchange of energy among the various kinds of internal energy.

A common method of achieving high energy levels within a molecule is to raise the kinetic energy of the molecule, which is known to be directly proportional to temperature. The combustion of fossil fuels or other organic materials is commonly used to produce temperatures that result in high kinetic energies. The mechanism by which energy transfer occurs in reactors utilizing oxidation or combustion of fossil fuels is predominantly convection—the movement of gases—and collisions between gas molecules. Energy is exchanged among the various component gas molecules as a result of these collisions. Consequently, all of the materials within such a reactor are at approximately the same temperature if there is good mixing of the gases promoting collisions among molecules.

Electrically powered resistance heaters produce heat by resistive effects which accompany the passage of electrical current through elements within the heaters. The amount of electrical current flow and the properties of the materials of which the elements are composed, in particular the resistivity, determine the amount and the characteristics of the energy produced. At relatively low temperatures, below 800° C., the energy is transferred from these heaters to the surrounding environment via a convection mechanism, that is, through collisions between gas molecules. At higher temperatures, the surfaces of the heaters radiate energy as light and approach the behavior of perfect black body radiators.

The theory of black body radiators is well known. The energy radiated is governed by the Stephan-Boltzmann equation:

$$M = cT^4$$

where M is the power of the energy radiated, c is Stephan's constant, and T is the absolute temperature. The spectral distribution of the radiation is given by Planck's law:

$$m = c/(L^5(\exp(K/LT) - 1))$$

where c and K are constants, L is the wavelength of the radiation, T is the absolute temperature, and m is the power radiated per unit area at the wavelength L. The maximum monochromatic emissivity is given by Wien's law:

$$L \times T = W$$

where L is the wavelength at which the maximum energy is radiated, T is the absolute temperature of the radiating object, and W is a constant. As is apparent from the Stephan-Boltzmann equation, where the power of the radiated energy is proportional to the fourth power of the absolute temperature, the power of the radiated energy increases rapidly with temperature. Once temperatures of about 800° C. are reached, energy transfer occurs more through emission of radiant energy than through natural convection processes. Radiant energy transfer is very fast since the energy is transmitted at the speed of light and occurs between two objects visible to each other. In contrast, energy transfer through inelastic collisions is much slower, dependent on the velocity of individual molecules and the frequency of collisions between the molecules. At the temperatures discussed above, that is, temperatures in the range of approximately 1100° C. to approximately 1800° C., the walls of the reaction chamber 18 can radiate light energy with an efficiency of about ninety-three percent. This means that about 93% of the energy absorbed by the material in the interior walls of the reaction chamber is re-emitted as radiant energy. In comparison, a perfect black body radiator would reemit, as radiant energy, 100% of the energy it had absorbed by whatever mechanism. While it is impossible for materials to function as perfect black body radiators, the ceramic materials disclosed above, operating at 93% efficiency, come nearly as close as is practically possible today. Thus, at the temperatures discussed above, an intense radiation field is sustained by emissions from the internal walls to permeate the reaction chamber even when the heaters 36 are not operating in a continuous fashion. This radiation field consists primarily of light with frequencies from the infra-red, near infra-red, and visible regions of the electromagnetic spectrum. This radiation field, preferably, will have a density of approximately thirty or more watts per cubic centimeter.

As organic materials are fed into the chamber 18, they immediately enter this intense radiation field composed of emissions from both the resistive heating elements and the walls of the reaction chamber. The characteristics of the radiation field, in terms of range of frequencies and relative intensities of those frequencies, are determined by the Stephan-Boltzmann, Planck, and Wien equations, described above and, thus, are dependent only on the absolute temperature. Since infrared and visible light are not absorbed well by gases, gases are heated relatively slowly through absorption of light. Since the gases within the system are at a temperature of approximately 800° C., gases injected into the system through the gas value 40 are heated initially by collisions with the gases already within the system. The gases are further heated within the reactor 18 by collisions with particles of solid carbon produced by the decomposition of organic materials. The temperature of the gases exiting the reactor exceeds 900° C. and is sufficient to promote the rapid decomposition of the gaseous organic molecules.

Infrared radiation is more strongly absorbed by solid and liquid materials. In the reaction chamber 18 the energy of the radiation field is absorbed by the organic waste materials and is transferred to the internal energies of the individual organic molecules within those materials. When sufficient energy is absorbed by the molecules, unimolecular decomposition of the organic molecules into their constituent atoms occurs.

Liquids also absorb infrared radiation. However, when liquids are fed into the reactor 18, the liquid disperses into small droplets which do not absorb infrared light energy as well as solids do. Liquids are heated by a combination of absorption of light energy and collisions with hot gases and the hot solid products of decomposition within the reactor. As a result, the decomposition of liquids produces larger particles of solid carbon. Organic molecules decompose into the elements carbon and hydrogen, as well as into atoms of whatever other elements may be present in the organic molecules of the waste materials being processed such as oxygen, nitrogen or halogens. The reaction chamber 18 and the entire system may be filled with nitrogen gas introduced through a conventional gas valve 39. Nevertheless, small amounts of oxygen may enter the system simultaneously with the influx of materials through the feeding chute 22. Two knife valves 26 or a rotary valve 25 or other similar devices are included in the feed chute such that the reaction chamber 18 is not directly connected to the atmosphere and the influx of oxygen is limited to very small amounts. The introduction of oxygen into the reaction chamber 18 and into the entire system is not desired and is to be limited as much as is practical, as the oxygen will react with carbon to form carbon monoxide, reducing the yield of one of the desired products, solid carbon.

Electrical current is supplied to the heaters 36 via a conventional power controller 38 and a conventional transformer 42. The electrical voltage is controlled to maintain a preselected temperature in the reaction chamber 18. Temperature may be measured in the reaction chamber 18 by a conventional temperature-measuring device 44 such as a thermocouple or, alternatively, by conventional infra-red devices. The signal from the temperature measuring device 44 is directed to a conventional temperature controller 46 which interprets the information and provides an appropriate signal to the power controller 38.

The signal from the temperature-measuring device 44 may also be used as a practical means to regulate the rate of introduction of solid material into the reaction chamber. As solid organic waste material is introduced into the reaction chamber 18, it is exposed to the intense radiation field present in the reaction chamber. The presence of this field, as discussed above, is indicated by temperatures within the reaction chamber 18 in the range of 1100° to 1800° C.

Upon exposure to the radiation field, the solid organic waste material will absorb the radiation impinging upon it. Depending on the amount of waste material present in the reaction chamber, and the surface area of the solid organic waste material exposed to the radiation field, the temperature within the reaction chamber, as indicated by the temperature-measuring device 44, may decrease. Ideally, the rate of introduction of solid material into the reaction chamber and the electrical current supply to the heaters are controlled so as to minimize changes in temperature within the reaction chamber 18, and maintain the temperature between 1250° to 1300° C.

Electrical current, as directed by the temperature controller 46 and the power controller 38 is supplied to the heaters 36 via the transformer 42. The transformer 42 is selected to provide a voltage appropriate for the particular heaters 36 used and the particular wiring configuration. Most radiant resistance heaters are low resistance, high current heaters. If connected in parallel, such heaters typically use voltages between 10 and 20 volts and currents between 150 and 750 amperes to achieve the above noted temperatures.

As discussed above, the organic waste materials are converted in the reaction chamber 18 to solid carbon, hydrogen gas, and small amounts of other atoms or small molecules. If inorganic materials, such as bottles, steel needles, or staples, are included in the materials being processed, the above-noted operating temperatures are above the melting point of most of the inorganic materials. These will form a residue on the bottom of the chamber. This residue is removed through a port 48 provided for that purpose.

To facilitate removal of the residue of low melting inorganic materials from the materials being processed, and to protect the ceramic walls, a liner 50 is provided in the bottom and side walls of the chamber. The liner 50 must be resistant to corrosion by the molten inorganic materials. Many ceramic materials, such as those used in the steel industry, will serve for this purpose. With large amounts of molten materials, an overflow is provided with a control device, not shown, such as is used in glass furnaces. With small amounts of molten materials, a lined, removable, and disposable vessel can be used to collect the molten materials. The vessels are then replaced periodically.

As discussed above, the carbon typically forms as small solid particles in the form of a powder. The carbon particles pass out of the chamber 18 suspended in the exhaust gas stream, composed primarily of hydrogen gas, through a conduit 52. Upon exiting the chamber, water may be added through a spray nozzle 54 to cool the gases to a temperature of around 760° C. Since most of the gases do not appreciably absorb infra-red radiation, their temperature will be less than the temperature of the reaction chamber 18 and only a small amount of water will be required. The addition of water for cooling may also aid in the agglomeration of the carbon into larger particles which will facilitate their collection.

The solid carbon is removed from the exhaust gas stream by passing through cyclone(s) 58 and filter(s) 62. The conventional cyclone(s) 58 are lined with materials that withstand the temperatures of the gases and abrasion caused by the solid materials conveyed with the gases. The filter(s) 62 are designed to withstand the temperature of the gases and use filtering media capable of operating at these temperatures, such as "Nextel" fabric marketed by the 3M Company of St. Paul, Minn. The use of such high-temperature filters virtually eliminates the need for further process steps prior to removal of carbon from the exhaust gas stream.

In passing through the cyclone(s) 58 and the filter(s) 62, more than 99.9% of the solid materials are removed from the gas stream. The resulting gas stream, from which substantially all of the suspended carbon particles have been removed, is sucked into a fan 84. The fan is also designed and constructed to operate at high temperatures, up to 800° C., so that additional pre-cooling is not required. Suitable fans are marketed by Industrial Gas Engineering Company, Inc. of Westmont, Ill. as "Thermo" high temperature fans.

Most of the exhaust gas stream is recirculated by the fan back into the cyclone(s) and filter(s). Recirculating the gases increases the total volume of gases downstream of the reaction chamber 18, and consequently insures that the proportion of total solids in the exhaust gas stream in not excessively high. Controlling the proportion of total solids in the exhaust gas stream allows the cyclone(s) 58 and filter(s) 62 to function properly and with greater reliability.

A small part of the exhaust gas stream is recirculated through the reactor to help sweep out the carbon. The remaining part of the exhaust gas stream is directed through a series of process steps before discharge to the environment. The specific process steps that may be included are determined primarily by economic considerations related to the size of the system. In all cases, equipment is provided to ensure that emissions to the environment are clean and safe, but the economically most attractive option depends upon the size of the processing system.

For very large systems, the exhaust gas stream passes through a cooler 64 to reduce the temperature of the gases to a level suitable for the conventional hydrogen-recovery equipment. In this regard, a semi-permeable membrane 66 allows the hydrogen to pass through while preventing the passage of other gases. Such membranes are available from Grace Membrane Systems of Houston, Tex. A compressor 68 sucks the hydrogen through the semi-permeable membrane and pressurizes the hydrogen for storage in a suitable vessel 69. Alternatively, the separated hydrogen gas can be utilized immediately, rather than stored for eventual long-term use, by being directed toward a hydrogen fuel cell or other device making use of hydrogen's unique physical or chemical properties.

The gases remaining after separation of hydrogen from the exhaust gas stream pass through an oxidizing reactor 70 designed to oxidize carbon and carbon monoxide that may be present in the gas stream to carbon dioxide. Air is added by a small blower, not shown, and the mixture passes through porous ceramic and conventional heaters 72 to provide the energy needed to complete the oxidation of hydrogen, carbon and carbon monoxide present to carbon dioxide and water.

The remaining gases pass through a conventional scrubber 74 to remove acid gases such as hydrochloric acid that may be present. The remaining gases, which should consist almost entirely of carbon dioxide and nitrogen, are released to the atmosphere.

For small systems, the remaining part of the exhaust gases may be directed without further treatment to a specially tuned internal combustion engine equipped with an alternator to produce electricity. The exhaust gases from the engine may be used to produce hot water or steam and scrubbed to remove acid gases prior to release to the environment.

The present system provides the capability to separately adjust the solid phase residence time and the gas phase residence time. The solid phase residence time is the time solid materials spend in the reactor, and is determined by the amount of time required for the organic solid materials to decompose or the inorganic materials to flow out of the reactor. Solid phase residence times in excess of 30 minutes are easily achieved. Decomposition times for organic materials are quite fast once the molecules achieve the temperature within the reactor, but it may take some time for the organic materials to reach this temperature. For example, the interior portion of a telephone book discharged to the reactor will require a few minutes to reach the temperature of the reactor.

The gas phase residence time is the time gases remain in the reactor system. The gas phase residence time is controlled by the amount of gas produced by the decomposition of the organic materials, the in-leakages of gases, the size of the reactor, and the amount of gases recycled through the system. Because the construction costs are low relative to other high temperature reactors, the present reactor is easily sized to provide three or more seconds of gas phase residence time. The recycle gas flow rate may be adjusted to decrease the residence time to improve productivity. A minimal recycle gas flow through the reactor system is required to sweep the carbon to the collection devices. A flow of one to five cubic feet per minute provides a gas phase residence time of minutes compared to the 2 seconds with incinerators.

In the HTFWR of Matovich, for example, the gas phase residence time is determined by the flow of inert or other gases used to form the fluid wall. In order to protect the carbon core from molten inorganic materials and other materials, the flow of gases in the fluid is relatively rapid, essentially as fast as the solids were falling to protect the wall. As a result, the gas phase and the solid phase residence times are essentially the same in the HTFWR and, at most, much less than 1 second.

Because the present method provides longer residence times than the HTFWR, the system can operate at lower temperatures and still achieve decomposition efficiencies that conform to state and federal regulations. In practicing the present method, the normal operating temperature of the reactor is 2350° F. with temperatures up to 3000° F. possible. These temperatures are lower than the minimum acceptable operating temperatures of the HTFWR (3300° F.) which was necessary to achieve total decomposition of a simple hydrocarbon, methane.

The use of lower operating temperatures provides benefits beyond reduced energy usage. In the present method, there is no need for an annular inert fluid wall to protect the reactor, and conventional insulation may be employed. This reduces operating and capital costs.

The direct control of residence times in the present reactor eliminates the need to extensively pretreat the feed materials. In addition to economic benefits, this provides a major benefit in reducing the handling of materials that may be toxic or dangerous. If the feed chute of the present reactor system is designed to account for the containers of the feed materials, there may be no need for preprocessing of feed materials.

In the present system, gases are recycled. Reuse is common in conventional carbon production systems as partial oxidation of the carbon is employed to produce carbon monoxide, which is reused as a fuel. Since partial oxidation of the carbon does not occur in the present system, the gases are recycled for other reasons:

(a) to provide sufficient total flow of gases to maintain the solids loading to the baghouse filter within the limits established by the manufacturer. The concentration of solids in the gases exiting the reactor system greatly exceeds that determined by filter manufacturers to be the upper limit for good operation, i.e., solids removal. The recycle gas dilutes this gas stream such that the concentration of solids falls within the acceptable limits.

(b) to prevent partial oxidation of carbon. Gases are recycled to eliminate the oxidizing environment from the system to maximize the recovery of carbon. Lowering the gas temperature also reduces the rate of oxidation of carbon. At temperatures below 2000° F., the oxidation of carbon is extremely slow.

(c) to lower the gas temperature to below the upper limit for safe operation of the fan and filter. Cooler gases lower the temperature of the gases exiting the reaction system.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method of processing waste material comprising organic matter consisting of solids, liquids, or mixtures of solids and liquids, by decomposing the organic matter into its elemental components in a processing system comprising a reactor having a substantially closed internal reaction chamber with interior walls and controlled-access inlet and outlet openings, the method comprising the steps of:

(a) supplying energy to the reaction chamber to maintain the reaction chamber at an energy level, as indicated by temperatures in the range of about 1100° C. to about 1800° C., sufficient to induce the interior walls of the reaction chamber to emit black-body radiation;

(b) generating a radiation field as a result of radiative emissions from the interior walls of the reaction chamber;

(c) introducing waste material through the inlet opening into the reaction chamber of the reactor to expose the organic matter to said radiation field;

(d) retaining the waste material within the reaction chamber until the organic matter is decomposed into its elemental constituents, including carbon and hydrogen, as a result of absorbing energy from said radiation field;

(e) withdrawing an exhaust stream comprising carbon and hydrogen from the reaction chamber through the outlet opening;

(f) removing carbon from the exhaust stream;

(g) recycling a portion of the exhaust stream to the reaction chamber to maintain a preselected proportion of carbon in the exhaust stream; and (h) separating hydrogen from the exhaust stream.

2. The method of claim 1 wherein the radiation field has a density of thirty or more watts per cubic centimeter.

3. The method of claim 1 wherein the hydrogen gas is separated from the exhaust gas stream by being drawn through a semipermeable membrane.

4. The method of claim 1 wherein the waste material further comprises inorganic matter, the method further comprising:

(i) collecting and removing from the reaction chamber interior walls inorganic material introduced into the reactor.

5. The method of claim 1 wherein the hydrogen separated from the exhaust stream is collected and stored for future use.

6. The method of claim 1 further comprising, between steps (e) and (f), cooling the exhaust stream.

7. The method of claim 6 wherein the cooling of the exhaust stream is achieved by spraying water into the exhaust stream.

8. The method of claim 7 wherein the exhaust stream is cooled to a temperature of approximately 750° C.

9. The method of claim 1 further comprising:

(i) directing the hydrogen to an apparatus for oxidizing hydrogen to produce an oxidized exit stream and electrical energy.

10. The method of claim 9 further comprising:

(j) directing the oxidized exit stream through a heat exchanger to derive thermal energy from the exit stream.

* * * * *